Oct. 8, 1940.  W. T. PEARSON  2,216,984
COOKING UTENSIL
Filed Feb. 15, 1940  2 Sheets-Sheet 1

Inventor
Willie T. Pearson
By Clarence A. O'Brien
and Hyman Berman
Attorneys

Oct. 8, 1940.  W. T. PEARSON  2,216,984
COOKING UTENSIL
Filed Feb. 15, 1940  2 Sheets-Sheet 2
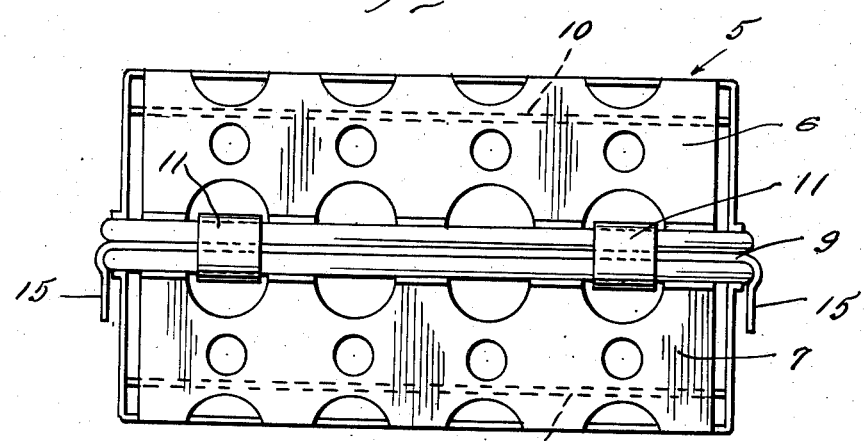
Fig. 4.
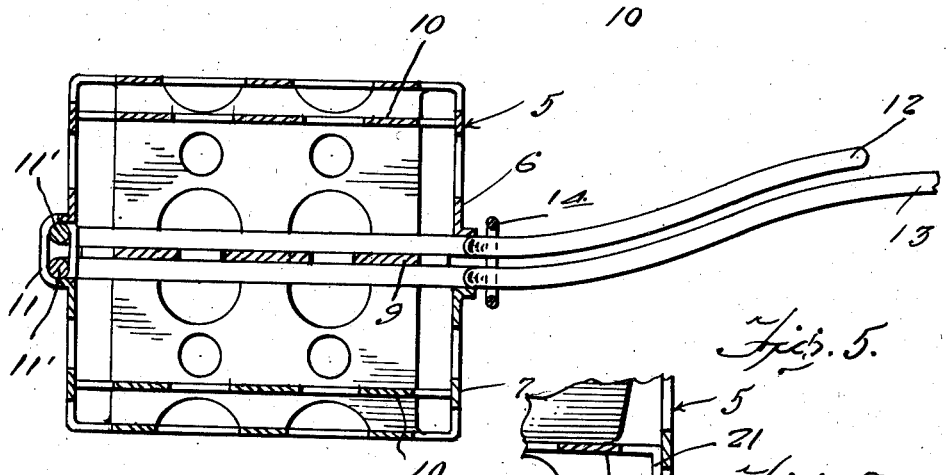
Fig. 5.
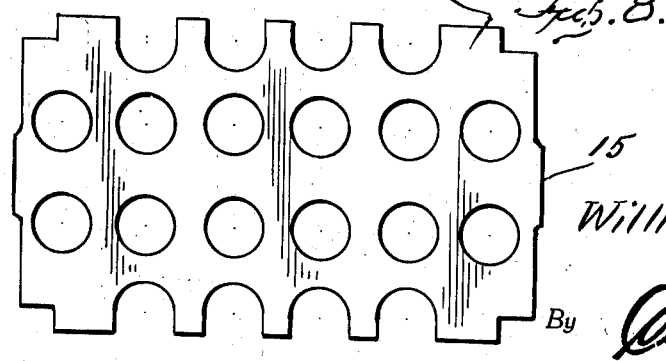
Fig. 6.
Fig. 8.
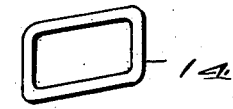
Inventor
Willie T. Pearson
By Clarence A. O'Brien
and Hyman Berman
Attorneys Patented Oct. 8, 1940

2,216,984

UNITED STATES PATENT OFFICE 2,216,984

COOKING UTENSIL

Willie Thomas Pearson, Jackson, Miss.

Application February 15, 1940, Serial No. 319,156

5 Claims. (Cl. 53—5)

This invention relates to a cooking utensil and while it may be employed within a home or similar place, it is especially adaptable for cooking out of doors over an open fire such as would be had on picnics, hunting or fishing trips, etc., and has for the primary object the provision of a device of this character which permits various kinds of cooking to be easily and successfully carried out, such as baking, broiling, frying, toasting, barbecueing and other well known types of cooking and also may be employed for roasting nuts and the like or for popping corn.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 4 is a rear elevation illustrating the device.

Figure 5 is a view similar to Figure 3 with the pans removed from the device.

Figure 6 is a plan view of a grill plate.

Figure 7 is a perspective view of a sliding securing means for the handles of the device.

Figure 8 is a detail sectional view illustrating a modification of this invention.

Figure 1:
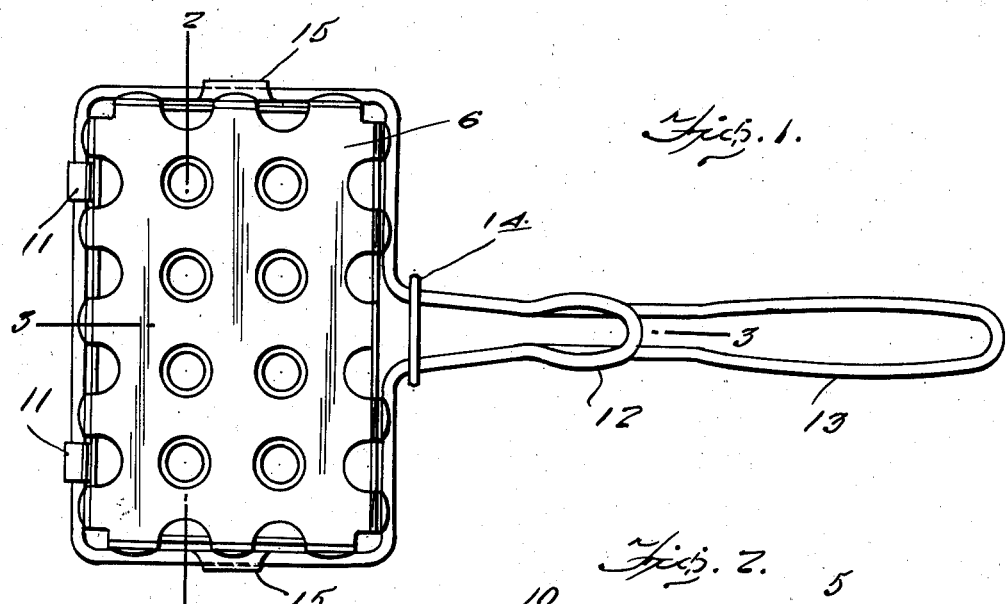
Figure 1 is a top plan view illustrating a cooking utensil constructed in accordance with my invention.

Referring in detail to the drawings, it will be seen that this invention primarily consists of a main unit 5 composed of hinged pan-like sections 6 and 7 and a pair of pans 8 mountable in the sections of the unit 5 and easily removable therefrom and a broiler plate 9 also removable from the unit 5.

The sections 6 and 7 of the unit 5 have perforated walls also false bottoms 10 permanently connected to the sections 6 and 7 and also perforated and spaced from the bottom walls of the sections 6 and 7. The walls of the sections 6 and 7 being perforated as specified permits heat to readily circulate through the unit 5 and about the pans 8 when the latter are employed.

The sections 6 and 7 are equipped with hinges 11 of any desired construction which will permit the sections to be readily swung open so that both will rest evenly upon a support or to be positioned in superimposed relation with the section 6 occupying an inverted position.

Reinforcing frames 11' are provided for the edges of the sections 6 and 7 and are extended at one side of the sections for the purpose of forming handles 12 and 13, one of which is slightly shorter than the other. A ring-like member 14 is slidable on the handles and when positioned over both handles will retain the sections 6 and 7 in superimposed relation and when disengaged from the handle 12 will permit the separation of the sections.

The pans 8 are of a conventional construction frequently employed for baking and are of such a size that they readily nest within the sections 6 and 7, and may be readily removed from the sections when desired.

Figure 2:
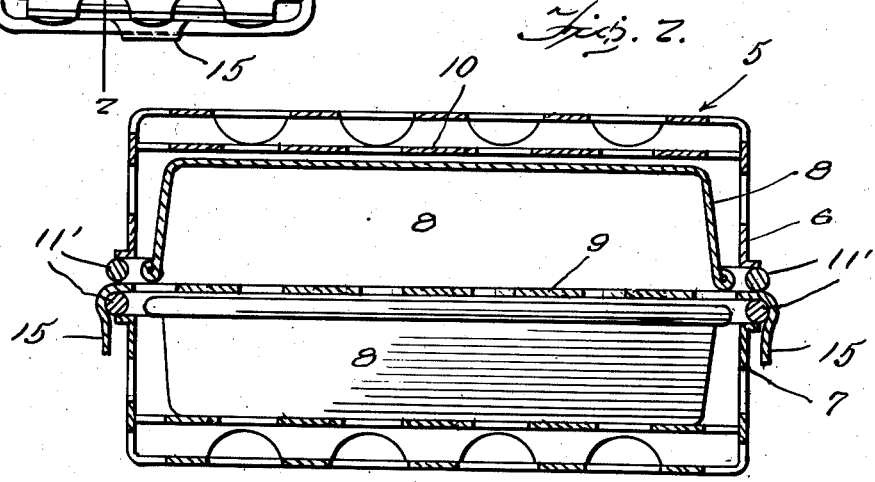
Figure 2 is a sectional view taken on the line 2—2 of Figure 1.

The broiler plate 9 which is perforated, as clearly shown in Figure 6, has formed upon opposite ends thereof guide flanges 15 which will engage over the reinforcing frame of either of the sections and preferably the section 7, as shown in Figure 2. The guide flanges permit the broiler plate 9 to be readily detached from the section 7 by sliding the latter in the direction of the handle 13 when the sections 6 and 7 are swung to occupy a fully open position.

The device assembled as shown in Figures 1 and 2 may be employed for baking foodstuffs and it is to be understood that when used for this purpose the broiler plate 9 may be removed permitting the baking pans to come in direct contact with each other. When used as specified it will be seen that a baking operation can be successfully carried out over an open fire and if desired can be positioned so as to be entirely covered by red hot coals of a fire and consequently permit baking to be carried out known as the "Dutch Oven" type.

With the sections 6 and 7 swung into a fully open position will place each pan 8 in an upright position, consequently permitting the pans to be employed for frying foodstuffs over an open fire. With the pans removed and the broiler plate 9 restored into the sections of the unit 5, the latter may be employed for broiling meats and like foodstuffs over an open fire by having the foodstuffs placed on the broiler plate. Also the broiler or grill plate 9 may be used for toasting bread and the like.

Figure 3:
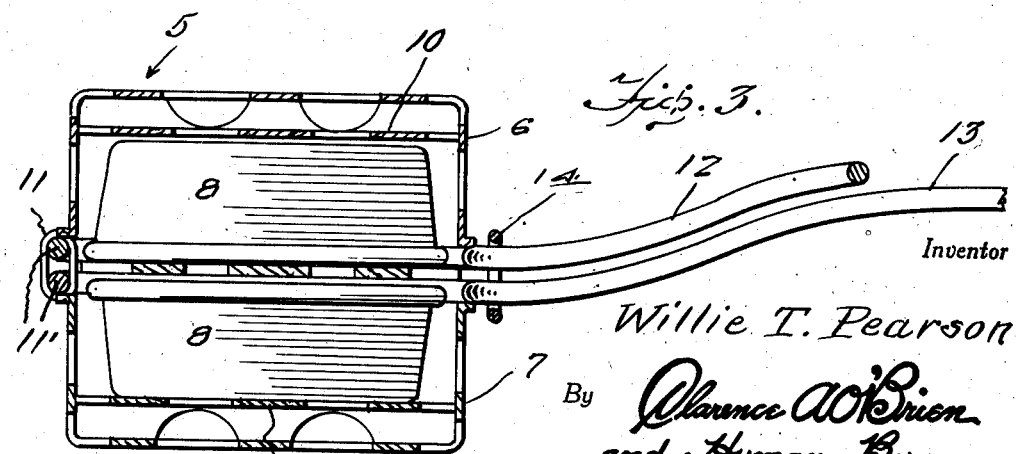
Figure 3 is a sectional view taken on the line 3—3 of Figure 1.

It is to be understood that when the device is assembled as shown in Figure 2 it may be employed for popping corn over a fire by placing corn within the lowermost pan, the upper pan preventing the corn from scattering when popping. While several different kinds of cooking have been specifically set forth as to how they may be carried out through the use of this invention, it is to be understood that many other forms of cooking can be carried out through the use of this device. Also it will be seen that when the device is in a closed position as shown in Figures 1 to 3 with the foodstuffs therein it can be easily handled and moved about for the purpose of stirring or agitating the foodstuffs without danger of spilling.

Referring to the modification of this invention, it is to be understood that the false bottoms may be detachable from the main unit 5 and as shown in Figure 8 one of these false bottoms as illustrated by the character 20 has end flanges 21 which frictionally engage the walls of the unit 5 to retain the false bottom against accidental displacement. However, the false bottom 20 may be manually removed when it is desired to thoroughly clean the unit 5.

It is believed that the foregoing description, when taken in connection with the drawings, will fully set forth the construction and advantages of this invention to those skilled in the art to which such a device relates, so that further detailed description will not be required.

Having thus described my invention, what I claim is:

1. In a device of the character described, a unit composed of companion perforated hingedly connected sections, handles for said sections, and means within said sections and removable therefrom for containing foodstuffs to permit cooking thereof in various well known manners over an open fire.

2. In a device of the class described, a main unit composed of hingedly connected pan-like sections, each having perforated walls and a perforated false bottom, handles for said sections, and food supporting means arranged within said sections and removable therefrom.

3. In a device of the class described, a main unit composed of hingedly connected pan-like sections, each having perforated walls and a perforated false bottom, handles for said sections, pans nested in said sections and removable therefrom.

4. In a device of the class described, a main unit composed of hingedly connected pan-like sections, each having perforated walls and a perforated false bottom, handles for said sections, pans nested in said sections and removable therefrom, and a grill plate provided with perforations and slidably connected with one of said sections and which may be employed in conjunction with said pans or without the latter.

5. In a device of the character described, a unit composed of pan-like sections each having perforated walls and a perforated false bottom rigidly connected thereto, reinforcing frames for the edges of said sections and extending therefrom to form handles, means for detachably connecting the handles, hinges for connecting said sections, removable pans nesting within said sections, and a perforated grill plate slidably mounted on one of said sections.

WILLIE T. PEARSON.